US008560103B2

(12) United States Patent
Kubli et al.

(10) Patent No.: US 8,560,103 B2

(45) Date of Patent: Oct. 15, 2013

(54) METHOD AND COMPUTING SYSTEM FOR DESIGNING A SHEET-METAL-FORMING PROCESS

(76) Inventors: Waldemar Kubli, Neerach (CH); Andreas Krainer, Baden (AT)

( * ) Notice: Subject to any disclaimer, the term of this patent is extended or adjusted under 35 U.S.C. 154(b) by 230 days.

(21) Appl. No.: 12/948,581

(22) Filed: Nov. 17, 2010

(65) Prior Publication Data

US 2012/0123579 A1 May 17, 2012

(51) Int. Cl.
*G06F 19/00* (2011.01)

(52) U.S. Cl.
USPC ............... 700/97; 700/104; 700/98; 700/105; 700/110; 700/145

(58) Field of Classification Search
None
See application file for complete search history.

(56) References Cited

U.S. PATENT DOCUMENTS

| | | | | |
|---|---|---|---|---|
| 5,390,127 | A * | 2/1995 | Tang et al. | 700/146 |
| 5,463,558 | A * | 10/1995 | Tang et al. | 700/97 |
| 6,219,055 | B1 * | 4/2001 | Bhargava et al. | 715/850 |
| 6,353,768 | B1 * | 3/2002 | Karafillis et al. | 700/97 |
| 7,158,922 | B2 * | 1/2007 | Sadagopan et al. | 703/2 |
| 7,623,939 | B2 * | 11/2009 | Hillmann et al. | 700/145 |
| 7,672,816 | B1 * | 3/2010 | Kulkarni et al. | 703/2 |
| 7,894,929 | B2 * | 2/2011 | Hillmann et al. | 700/145 |
| 8,280,708 | B2 * | 10/2012 | Kubli et al. | 703/7 |
| 2008/0004850 | A1 * | 1/2008 | Wang | 703/13 |
| 2010/0180236 | A1 * | 7/2010 | Lin et al. | 715/851 |

FOREIGN PATENT DOCUMENTS

WO WO 2010/033929 3/2010

OTHER PUBLICATIONS

Gašper Gantar, Tomaž Pepelnjak, Karl Kuzman, Optimization of sheet metal forming processes by the use of numerical simulations, Journal of Materials Processing Technology, vols. 130-131, Dec. 20, 2002, pp. 54-59.*

"Siemens PLM Software NX 7.0", Develop3d Magazine, print issue, Nov. 2009; online version available as of Mar. 30, 2011 at http://develop3d.com/reviews/siemens-plm-software-nx-7.0

Kaulich, Christoph and Wenzlaff, Michael, "IndiForm—Eine intuitive Bedienoberfläche für die industrielle Umformsimulation" ("IndiForm—An intuitive graphical user interface for industrial simulation of forming operations"), LS-DYNA Forum, Bamberg 2010, Metallumformung III, GNS mbH, published in Bamberg, Germany; online version available as of Mar. 30, 2011 at http://www.dynamore.de/dokumente/papers-1/2010-deutsches-forum/papers/C-III-03.pdf?set_language=de.

Anderson, Taylor, "Automating the Design Validation Process with NX Check-Mate", Desktop Engineering, vol. 14, Issue 9, May 2009; online version available as of Mar. 30, 2011 at http://www.deskeng.com/articles/aaapyy.htm.

(Continued)

*Primary Examiner* — Kavita Padmanabhan
*Assistant Examiner* — Christopher E Everett
(74) *Attorney, Agent, or Firm* — Leyendecker and Lemire, LLC

(57) ABSTRACT

A method for designing a formed sheet-metal part using a computing system is described. The method typically includes performing a numerical simulation of the forming process and computing a local property variable associated with points of the part. Problem zones of the sheet-metal part are identified based on the numerical simulation, and a visual representation of the sheet-metal part, in which problem zones are identified, is displayed. Information about a problem zone, such as status of the problem zone and the problem zone's unique identifier, are visually displayed.

15 Claims, 4 Drawing Sheets

(56) References Cited

OTHER PUBLICATIONS

NX Checker, Siemens PLM Software, 2008; online version available as of Mar. 30, 2011 at http://www.plm.automation.siemens.com/de__de/lmages/checker__tcm73-62406.pdf.

etaDYNAFORM User's Manual Version 5.5, Chapter 8, Engineering Technology Associates, Inc., Troy, Michigan (US), 2006; online version available as of Mar. 30, 2011 at http://www.dynamore.de/documents/manuals/eta-dynaform-manuals/archiv/dynaform-5.5-user-manual?set__language=en.

Miller, B. and Bond, R., "The practical use of simulation in the sheet metal forming industry", Wilde FEA Ltd., 2001, XP002621095; online version available as of Mar. 30, 2011 at http://citeseerx.ist.psu.edu/viewdoc/summary?doi=10.1.1.118.813.

Shi X et al., "Simulation of sheet metal forming by a one-step approach: Choice of element", Journal of Materials Processing Technology 20010117 Elsevier Science S.A., vol. 108, No. 3, Jan. 17, 2001, pp. 300-306, XP002621096, DOI: DOI:10.1016/S0924-0136(00)00846-3.

Wang Y, et al., "Research on applying one-step simulation to blank design in sheet metal forming", Journal of Materials Processing Technology 20020115 Elsevier Ltd GB, vol. 120, No. 1-3, Jan. 15, 2002, pp. 111-114, XP002621097, DOI: DOI:10.1016/S0924-0136(01)01197-9.

European Search Report No. EP 10 40 5221, Feb. 8, 2011, Munich, Germany.

European Search Report No. EP 10 40 5222, Feb. 8, 2011, Munich, Germany.

* cited by examiner

METHOD AND COMPUTING SYSTEM FOR DESIGNING A SHEET-METAL-FORMING PROCESS

CROSS-REFERENCE TO RELATED APPLICATIONS

U.S. patent application Ser. No. 12/948,531, entitled "Method and System for Designing a Formed Sheet-Metal Part", and U.S. patent application Ser. No. 12/948,555, entitled "Method and System for Processing and Displaying Sheet-Metal-Forming Simulation Parameters", each having at least one common inventor with this patent application, and being commonly owned with this patent application, were filed concurrently with this patent application, and accordingly, are incorporated by reference herein for all purposes.

BACKGROUND

Formed metal parts and in particular formed sheet-metal parts are manufactured in multi-component forming presses by deep drawing, restriking, folding, trimming, etc., involving different forming tools.

For the configuration of metal-forming tools (for example, punches, dies, and blank holders), as well as for the configuration of metal-forming processes (for example, tool forces, draw beads, lubrication, shape, and material for the sheet-metal blank), CAD/CAE (computer-aided design/computer-aided engineering) programs are utilized. These simulate and model, respectively, a metal-forming process and in particular a sheet-metal-forming process by means of finite elements on the basis of simulation parameters. Simulation parameters describe

- the geometry or shape of the forming tools utilized in the metal-forming process,
- process parameters or metal-forming parameters, such as the lubrication, processing forces, drawbeads, etc.
- material parameters of the material being formed, such as thickness, elastic properties, yield and hardening behaviour, physical characteristics etc.

The simulation parameters together with the geometry of the part in the desired (target) state shall be called input parameters. They comprise the parameters that can be influenced by the designer of the forming process and that can be varied in order to optimize the process.

The simulation programs create, by numerical simulation, result values comprising a description of the geometry of a sheet-metal part after the forming process as well as the distribution of state variables, such as elongations and stresses in the formed sheet-metal part. They also may calculate, from the result values, values of certain characteristic variables, called performance variables, which express a quality of the formed sheet-metal part. Both the state variables and the performance variables considered are defined over the material of the sheet-metal part. That is, each material point of the part (or, in a simplified view, each surface point of the part) is associated with a particular, local value of each state variable and the performance variable. Henceforth, state variables and performance variables shall be subsumed by the term "local property variables". Different types of performance variables and visual representations of the result values and performance variables can be computed and displayed in a post-simulation analysis. Correspondingly, further sets of parameters are used to control the numerical simulation itself (control parameters) and to control different types of post-simulation analysis (analysis parameters).

The values of selected ones of state variables or performance variables are superimposed on a visualisation of a 3D-model of the formed part. This takes place, for example, in a colour contour depiction by colouring the model in every point of the part, respectively, of its surface in accordance with the values of one or more of the variables chosen.

An important task when designing the geometry of the part and defining the simulation parameters is to detect problem zones of the part in which the forming process may cause the finished part to be of lower quality than desired. For example, the material may be stretched too much and exhibit cracks or tears, develop wrinkles, surface lows or grooves, not be sufficiently stretched, exhibit shape deviations due to springback, etc. Depending on the geometry of the part and the simulation parameters, different problems appear in different zones of the part and have to be taken into account during part and simulation parameters design. Typically, the simulation parameters (thus, the geometry of the part and/or the process parameters and/or the material parameters) are adapted iteratively, between simulation runs of the forming process, until the overall result is satisfactory. There is a need to assist users in this process.

In the article "Siemens PLM Software NX 7.0", Develop3d Magazine, print issue, November 2009, the section "issue management" describes the use of Siemens "PLM's NX Check-Mate" product which runs checks on a HD3D ("High Definition Information for Product Development") model and returns a visual list of issues that it finds. Issues can be small faces that do not match Finite Element Analysis (FEA) requirements. Issues are identified through automated checks and the system assigns it to the person or team responsible by issuing a change request to a further software system.

BRIEF SUMMARY

Many of the embodiments described herein are generally directed to a method and computing system for designing a sheet-metal-forming process of the type mentioned initially, which assists a user in handling problem zones of the sheet-metal part.

The method for designing a sheet-metal-forming process in which a sheet-metal part is formed is performed by a processor of a computing system, by means of

- input parameters, comprising at least one of simulation parameters and a numerical model of a geometry of the part,
- a numerical simulation of the forming process by which the part is formed, based on the input parameters, and of
- local property variables that are associated with points of the part and are computed from results of the numerical simulation of the forming process, and by a method for assisting the user in managing problem zones of the formed sheet-metal part, the method comprising the steps of:

- the processor determining one or more problem zones of the sheet-metal part based on the results of the numerical simulation of the forming process or based on user input;
- the processor determining, from the model of the geometry of the sheet-metal part, a visual representation of the sheet-metal part, and displaying this visual representation on a display device operatively coupled to the processor; wherein this visual representation comprises visual information that indicates the location of at least one of the problem zones on the sheet-metal part;

the processor computing and displaying on the display device, a visual representation of information associated with the at least one problem zone whose location is indicated.

This allows a user to manage problem zones of the formed sheet-metal part by identifying them and managing them in a visual representation of the formed part, together with information associated with the problem zones. In particular, for large and complex geometries the possibility of overlooking a problem zone is reduced or eliminated.

In contrast to a system that determines whether a CAD-design is internally consistent; e.g., that no illegal combination of elements is used, or that two elements occupy the same space; the present method is directed to problems related to the manufacturing process for forming the modeled sheet-metal part.

In an embodiment, the visual representation of the sheet-metal part comprises visual information that is representative of at least one of the local property variables. This allows a user to superimpose a visualization of values of such variables on the representation of the part, together with the visualization of the problem zones, which makes it easier for a human user to understand the cause of problems.

In an embodiment, the step of determining one or more problem zones based on the results of the numerical simulation of the forming process comprises the steps of the processor determining at least one critical area of the sheet-metal part in which a problem criterion is satisfied; wherein the problem criterion is defined in terms of the local property variables;

the processor determining, for each critical area determined, an associated problem zone, wherein the problem zone is either identical to the critical area, or is determined as a simplified contour located on the sheet-metal part at the location of the critical area. The term "simplified" can mean that the outline of the critical area is smoothed (filtered), or replaced by a standard shape such as a circle, oval, square etc. shaped in approximation of the critical area.

The interaction with the user in these steps can involve (in a semi-automatic fashion) the user selecting or defining a problem criterion, the system computing the critical areas of the part where the problem criterion is satisfied, the system graphically marking these areas and assigning each area a unique label. The graphical representation of the part may be rotated and viewed, in order to render each problem zone visible. For each automatically determined critical area the user can be asked to accept it as a problem zone, or to reject it. A rejected one will not be considered in further analysis. An accepted problem zone may also be used in design variants. For each automatically determined critical area the user can be allowed to modify the label identifying the critical area or the associated problem zone. If in the first step no critical area is found, the remaining steps need not be performed. By determining the problem zones automatically, they are defined in a consistent and reproducible manner, which often is not the case for manually defined problem zones.

In an embodiment, the step of determining a problem zone based on user input comprises the steps of the processor accepting a user input by means of a pointing device indicating at least one point on the visual representation of the sheet-metal part and the processor computing the location of a corresponding zone in the numerical model of the sheet-metal part.

Such a manual user input can involve the user designating a zone on a graphic representation of the part by drawing "on the part"; i.e., the intersection of the line of view for the projection seen by the user with the 3D-model of the part designates a point on the part. Several points may be designated and joined by a smooth curve (e.g., spline, Bézier, etc.), or one point may be designated, and a radius of the zone centered on the point. Then the system or the user assigns the zone a unique label. The problem zones defined manually in this manner allow to track the properties of these zones over design modifications and/or to label zones in which problems are expected to occur. When a series of similar parts is used, or part models are reused from a library and modified, then either the usual suspects can be defined manually right away, and/or stored definitions of problem zones associated with the library models may be loaded and reused as well. When, at a later stage with different process parameters and/or with a modified geometry, a problem criterion is satisfied, it is assigned to the existing, manually defined problem zone. A manually defined problem zone can be manually assigned a type and/or a problem criterion. Once this assignment is done, the criterion can be applied automatically to the problem zone; e.g., when the automatic analysis is performed, on the same geometry or a modified geometry onto which the problem zone has been mapped.

In further user interactions, the user may choose a problem zone by selecting the problem zone in a graphical representation of the part or from a GUI element displaying GUI elements representative of one or more of the problem zones. Such GUI elements may be (hierarchical) dialogs, lists, list boxes, drop-down-lists, etc. The system may display GUI elements in a control pane for viewing results and viewing and modifying parameters associated with the problem zone. For example, a control pane may be arranged separate from the graphical representation of the part, or may be a floating pane that is graphically linked to the view of the problem zone in the graphical representation of the part and displays at least some of the problem zone parameters and other information on the problem zone.

Information on a problem zone and associated with the problem zone comprises at least one of:

a status of the problem zone; for example, "ok" or "resolved" and "not ok" or "unresolved"; and optionally also an intermediate status such as "acceptable", or a status such as "ignored". The status may be indicated by visual features such as the color (red/green/yellow) and may be set automatically, according to the evaluation of the problem criterion for the problem zone, and may be set and/or modified by the user. A user may override, by setting or modifying a status, the automatically generated status.

a label that uniquely identifies the problem zone further information, such as one or more of the value, an average value, a maximum or minimum value, etc., of one or more numerical variables characterizing the problem zone, that is, of variables that are relevant to the criterion associated with the problem zone.

In an embodiment, the local property variables comprise at least one of state variables representing the state of the material of the sheet-metal part after the forming process or during the forming process in each point of the part; and performance variables which express a quality of the formed sheet-metal part in each point of the part.

In an embodiment, the method comprises the step of grouping problem zones according to type (or defined according to a user selection of problem zones from different types) and displaying in the visual representation of the sheet-metal part or in an associated control pane only those problem zones of one or more selected types or user-defined group. A particular type may correspond to a certain problem criterion being satisfied (such as a certain local property variable being exceeded), or to a particular type of structural problem or failure, such as splitting or cracking.

In an embodiment, the method comprises the step of the processor computing and displaying on the display device, a visual representation of different types of status that are associated with problem zones, and, optionally, associated with each type of status, a number (count) indicating the number of problem zones that have said status. This can be done for all problem zones, or only for problem zones of a user-selected type or group.

In an embodiment, the method comprises the steps of the processor computing and displaying on the display device a visual representation of the geometry of the sheet-metal part as it changes in the course of the forming process;

the location and optionally the shape of at least one problem zone tied to the material points of the sheet-metal part and being deformed along with the part.

This visualization of the change can be done by means of a series of snapshots or as an animation, that is, as a temporal sequence of images or as a set of images displayed simultaneously. In both cases, values of the relevant parameter or problem criterion can be superimposed in the part display pane or in a separate pane.

In an embodiment, the method comprises the steps of the processor accepting user input which defines modified input parameters, that is, a modified geometry of the formed sheet-metal part and/or modified simulation parameters, the processor simulating the forming process based on the modified input parameters and computing the local property variables from the results of the numerical simulation of the forming process, the processor determining for at least one of the problem zones of the sheet-metal part whether a problem criterion is satisfied; wherein the problem criterion is defined in terms of the local property variables;

the processor computing and displaying on the display device, an update of the visual representation of the information associated with the at least one problem zone. This representation may be the coloring or labeling of the problem zone itself and/or the information displayed in an associated fixed or floating pane.

This allows the user to change the input parameters and thereby eliminate critical areas. Progress becomes visible automatically as the modifications (if properly done by the user) cause the status of some problem zones to change for example from “not ok” to “ok”, and the count of the number of problem zones for each status is updated automatically. The modified input parameters and in particular also the modified geometry can correspond to a design variation: A definition of the problem zones (determined automatically and/or based on user input) can be stored on a computer-readable medium in association with the part geometry and optionally further parameters, to be reused at a different time and with a modified part geometry representing, e.g., a design variation.

In an embodiment, the method comprises the steps of the processor accepting user input that defines a modified geometry of the formed sheet-metal part (which may be a final or target geometry, or an intermediate geometry of part created in the course of the forming process) or tools and the processor computing and displaying on the display device the modified geometry and visual information that indicates a modified location of at least one of the problem zones;

wherein the modified location of the at least one problem zone is computed from the location of the at least one problem zone by mapping points from the geometry of the sheet-metal part to points on the geometry of the modified sheet-metal part. The mapping can be done by determining, for a point, the closest point on the modified part. Alternatively, the mapping is done by projecting a point in a direction normal to the surface of the part or of the modified part, or by moving the point together with a geometric feature that is moved or modified.

This allows the system to transfer the problem zones, which are in principle tied to the points of the material of the formed part, to parts whose geometry has been modified by the user. This allows a user to track and use problem zones in a development process in which several design variations of the formed part are created: Once defined in one variation, a definition of the problem zones can be stored on a computer-readable medium, in association with a first part geometry, and reloaded and mapped to another, similar second part geometry.

This second part geometry may be generated manually; e.g., by modifying the first geometry, or by means of a simulation of the forming process. In the latter case, the user modifies not the part geometry but rather the geometry of one or more simulated forming tools that are used to manufacture the part. The forming process is simulated, based on these forming tools, resulting in the modified geometry of the part, that is, the second part geometry.

In an analog fashion, when a simulation model is replaced by another one which uses a different approximation by finite elements, then problem zones are transformed to the new model according to their geometric shape and geometric location on the part.

In an embodiment, the method comprises the steps of the processor accepting user input identifying one problem zone, and the processor computing and displaying on the display device a magnified view of the problem zone from a viewing angle at which the problem zone is not occluded by other zones of the sheet-metal part, or is occluded as little as possible. This can be done, e.g., by choosing a surface normal in the region of the center of gravity of the problem zone and by placing the viewpoint for the view of the problem zone at a point along this normal, at a distance at which a large part or the entire problem zone is visible. When starting from another view of the formed part, the system generates intermediate views corresponding to a smooth flight from the other view to the view of the problem zone.

A method for designing a sheet-metal-forming process in which a sheet-metal part is formed, performed by a processor of a computing system, by means of input parameters, comprising at least one of simulation parameters and a numerical model of a geometry of the part, a numerical simulation of the forming process by which the part is formed, based on the input parameters, and of local property variables that are associated with points of the part or with points of at least one forming tool used in the forming process and are computed from results of the numerical simulation of the forming process, a method for assisting the user in managing problem zones of the formed sheet-metal part, the method comprising the steps of:

the processor determining one or more problem zones of the sheet-metal part or of the forming tool based on the results of the numerical simulation of the forming process or based on user input;

the processor determining, from the model of the geometry of the sheet-metal part, a visual representation of the forming tool, and displaying this visual representation on a display device operatively coupled to the processor; wherein this visual representation comprises visual information that is representative of at least one of the local property variables and comprises visual information that indicates the location of at least one of the problem zones on the forming tool;

the processor computing and displaying on the display device, a visual representation of information associated with the at least one problem zone whose location is indicated.

In an embodiment, a computer program product for the designing of sheet-metal-forming processes is loadable into an internal memory of a digital computer or a computer system, and comprises computer-executable instructions to cause one or more processors of the computer or computer system execute the design method. In another embodiment, the computer program product comprises a computer-readable medium having the computer-executable instructions recorded thereon. The computer-readable medium preferably is non-transitory; that is, tangible. In still another embodiment, the computer program is embodied as a reproducible computer-readable signal, and thus can be transmitted in the form of such a signal.

A method of manufacturing a non-transitory computer-readable medium, comprises the step of storing, on the computer-readable medium, computer-executable instructions which when executed by a processor of a computing system, cause the computing system to perform the method steps described above.

Nothing in the above brief summary is intended to limit the scope of the patent claims, or limit the scope of the balance of this specification.

BRIEF DESCRIPTION OF THE DRAWINGS

The subject matter of the invention will be explained in more detail in the following text with reference to exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION

Terms Used

Figure 1:
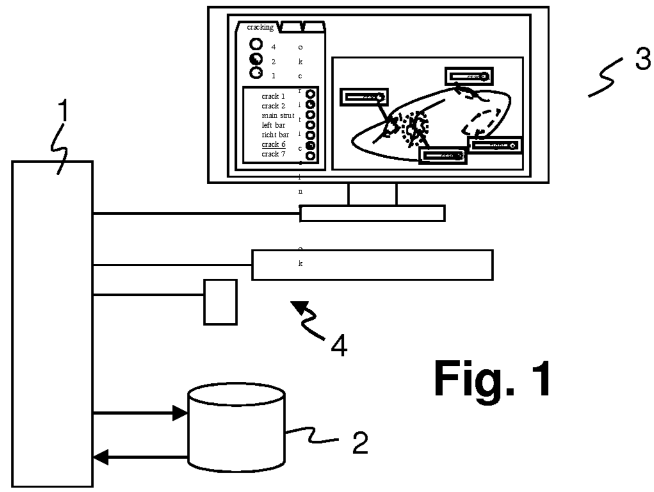
FIG. 1 schematically shows a structure of an embodiment of a sheet-metal-forming design system.

Formed part: For the sake of brevity, the terms "formed part" or simply "part" shall be used instead of "formed sheet-metal part" throughout the present application.

Parameters: Parameters may be of the following types:
- simulation parameters: may include nominal parameters plus parameters defining a stochastic variation around the nominal parameters. They may be controllable and noncontrollable (disturbances). They comprise
  - process parameters of the process being simulated; and
  - geometry of tools and/or parts; and
  - material parameters of the material being formed.
- control parameters (of numerical simulation).
- analysis parameters for post-simulation analysis.

Input parameters: Input parameters are the inputs to the design process, that is, on the one hand, the simulation parameters and on the other hand a model of the geometry of the part, that is, either a target geometry after the forming process, or an intermediate geometry, resp. the tooling geometry used to form the target or intermediate geometry.

Result variables: Result variables have result values computed by simulation of a forming process (and therefore constitute results of the numerical simulation of the forming process), and describe
- geometry of the formed part after and in the course of forming
- state variables of the formed part after and in the course of forming, such as material conditions (elongations, stresses and the like).

Performance variables: Performance variables are computed from result variables and express a quality of the formed sheet-metal part in each point of the part, for example, thinning or thickening effects on the sheet metal, failure and wrinkling criteria, springback, the thickness of the part, or a statistical property of a variable, such as the variability of the thickness (e.g., a standard deviation of the expected thickness).

Local property variables: Local property variables are associated with points of the part. They comprise state variables or performance variables. Since local property variables and performance variables are computed from the result variables, or in the case of state variables are identical to result variables, they may also be considered to be (indirect) results of the numerical simulation of the forming process. The common property of all these variables is that their values are directly or indirectly based on a numerical simulation of the forming process, or, in the case of statistical properties, on several simulation runs.

Problem criteria: Problem criteria define whether a problem exists at a particular location of the formed part. They are based on local property variables. They are defined in terms of parameters, including specification limits Critical area: an area of a part which fulfills a given problem criterion.

Problem zone: an area of a formed part that is either
- based on a critical area that was determined automatically and optionally accepted by a user. The problem zone may be identical in shape to the critical area, or may be derived from the critical area by smoothing, growing, shrinking or replacing by a simplified shape; or
- designated manually by a user.

GUI control pane: an area of a display screen displaying parameters and control elements for selected problem zones. It may be a fixed area of the screen or application window and/or a box (with less data) attached to the graphic representation of the problem zone.

Predefined: a predefined entity, be it a value, or a function, or a criterion, etc., can, for example, be specified by manufacturing guidelines and/or retrieved from storage and/or defined by a user.

FIG. 1 schematically shows a structure of an embodiment of a computing system for designing a formed sheet-metal part; with a processing unit 1 operatively coupled to a display 3 and a persistent storage unit 2, as well as input devices 4 such as a keyboard and/or pointing device, such as a computer mouse. The processing unit 1 comprises a processor and random access memory.

Figure 2:
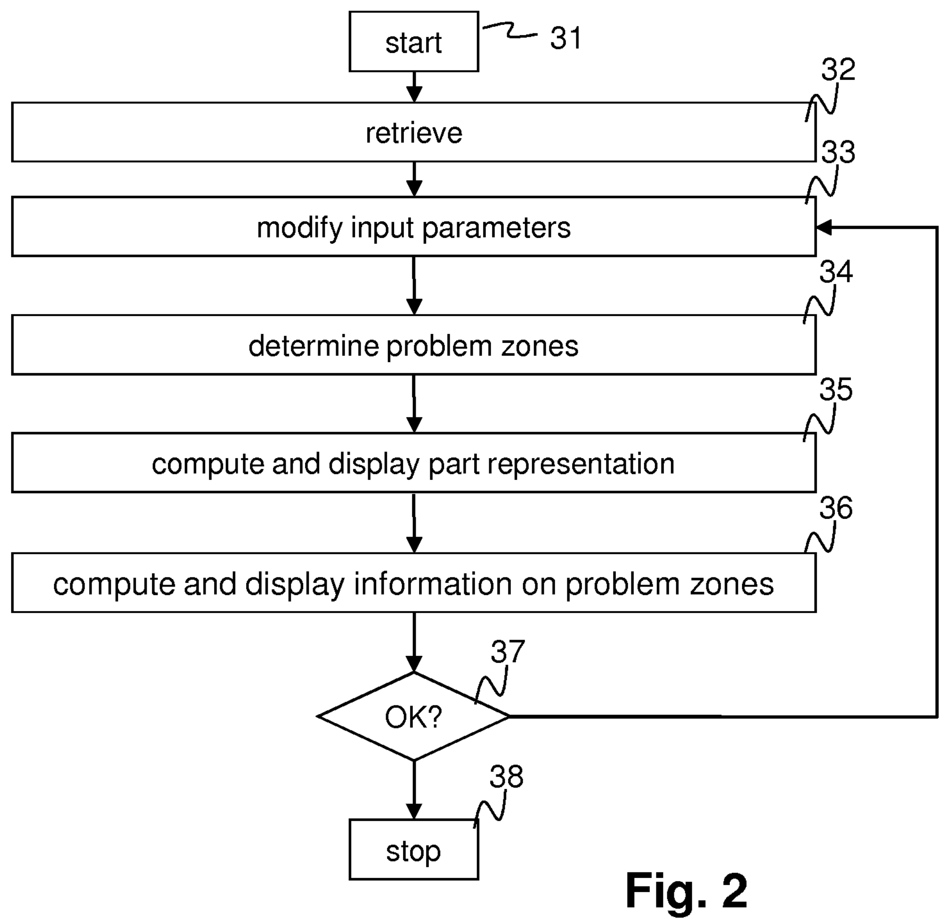
FIG. 2 shows a flow diagram of an embodiment of a sheet-metal-forming design process.

The computer system is programmed to execute, among others, a method for designing a formed sheet-metal part, according to the flow diagram of FIG. 2. The method steps displayed therein take place as one sub-part of a complete part design procedure. After a start and initialization step 31, in a retrieval and preparation step 32, a user of the computer system, interactively specifies or loads from memory the input parameters. In a further step 33, the user may modify the input parameters. This may involve the user modifying the simulation parameters and in particular the process parameters, and/or modifying a modeled geometry of the part. The modeled geometry is the target geometry or an intermediate geometry of a sheet-metal part that is to be formed by deforming the part, starting from an initial geometry. Alternatively, the geometry of tools for forming the part is modelled, and the geometry of the part during and after forming is determined by a numerical simulation of the forming process. In step 34, the computer system determines, automatically and/or through interaction with the user, problem zones associated with the sheet-metal part. In step 35, a visual representation of the part in the target or intermediate geometry is computed and displayed, including a visualization of the location of the problem zones on the part. In step 36, the information related to and describing the problem zones is computed and displayed. In step 37, according to user input, the method may branch back to allow the further, iterative modification of the input parameters according to step 33, or may branch to the termination 38 of this aspect of the part-design procedure.

Figure 3:
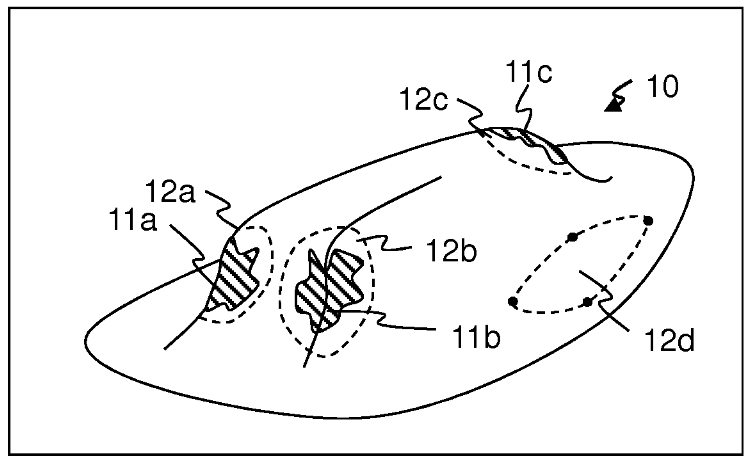
FIG. 3 schematically shows the display of a formed part.

FIG. 3 schematically shows a visualization of a formed part 10 as computed in step 35 and displayed on display 3. Various methods for simulating a forming process that gives the part a desired shape or geometry are known. They are usually based on FEM computation methods and may include computation of the shape (geometry) and the material properties (state) of the part after the forming process, and therefrom local property variables such as state variables and performance variables, as described in the introductory part of the present application. Areas of the formed part 10 in which local property variables satisfy a predetermined problem criterion are shown as critical areas 11*a*, 11*b*, 11*c*. Local property variables are computed from the simulation and are, for example, indicative of a type of material failure or of another undesired effect, such as:

- splitting of the material (or tearing, cracking etc, caused by excessive stretching of the material)
- wrinkles
- springback
- surface defects
- shock or slip marks (occurring when the sheet-metal is pulled over an edge of die or punch)

Problem criteria associated with such variables can be limit values or ranges, and a criterion can be said to be satisfied when a limit is exceeded or a value falls within a given range. The criteria are defined by manufacturers' guidelines and/or selected or defined by a user. Further problem criteria are:

- draw in (the distance by which the edge or a line parallel to the edge of the part is drawn in, inward from its original location or from its location earlier in the forming process, by the forming process)
- distance of the part edge, after forming, from a predefined course of the edge
- structural criteria: such criteria can be freely defined in terms of user-selected variables. For example, such a structural criterion may be fulfilled in a given point when the value of a first variable (e.g., material thickness) lies within a first range, and the value of a second variable (e.g., effective plastic strain or a stress component) lies within a second range, or when the result of a mathematical function combining a first and a second variable (or more variables) lies within a certain range. A user can, by means of a textual or graphical user interface, specify variables (as mathematical functions of local property variables and/or previously defined variables) and, for each variable, a corresponding range of values.

The critical areas 11*a*, 11*b*, 11*c* are determined automatically by the computing system, by testing, for the points of the formed part 10, whether a criterion is satisfied, and storing the result of this test in association with the points. The critical areas 11*a*, 11*b*, 11*c* are indicated in the visualization of the part by, e.g., coloring, (replaced, in FIG. 3, by hatching).

In addition, the visualization of the formed part 10 may be colored (not shown) in the areas that are not critical areas, the color being indicative of the value of one of the performance variables, in particular the performance variable that is the basis of the problem criterion on which the computation of the critical areas and associated problem zones being selected and displayed is based. In the cases in which a problem criterion is based on a single performance variable, and a type of problem is selected by the user, this performance variable can be automatically selected and its value represented by the coloring.

Associated with the critical areas are problem zones 12*a*, 12*b*, 12*c*. A problem zone has a simplified outline generated by smoothing the outline of the associated critical area or by replacing the outline with a standard shape such as an oval, rectangle etc. which may be distorted to fit the shape of the critical area. The shape of the problem zone

- may be mapped onto the 3D representation of the formed part 10 and projected into the visualization of the part in the GUI (an oval shape, for example, will be distorted according to the shape of the part, and then be projected onto the displayed image),
- or the shape may be overlaid over the projection of the part (an oval shape will appear as an oval in the displayed image).

The distinction between problem zones and critical areas is mainly a conceptual one: since a critical area, being determined from the simulation results, may have irregular edges or comprise several small areas lying closely together, it may be visually more appealing to represent it by a simplified outline, which is given the different name "problem zone" in order to make the difference apparent. However, in an embodiment, the critical areas and problem zones may be identical, with only one representation being maintained in the computing system and being displayed.

Other problem zones can be defined manually; e.g., by the user drawing on the visualization of the formed part 10. FIG. 3 shows one such manually defined zone 12*d* with control points of a line defining the problem zone.

Each problem zone 12 is associated with a problem type; e.g., corresponding to the problem criterion underlying the automatic detection of the problem zone. Other problem types may be defined at the user's choice and be freely assigned by the user.

Figure 4:
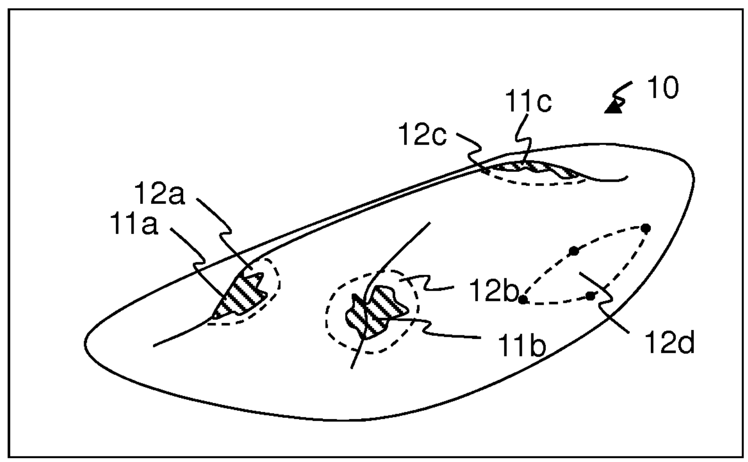
FIGS. 4, 5 schematically show the display of the formed part in different shapes in the course of the forming process.
Figure 5:
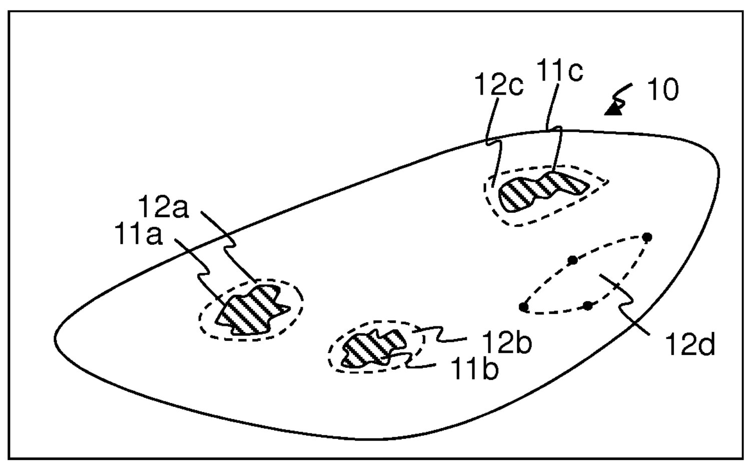

FIGS. 4 and 5 schematically show the display of the formed part 10 in different shapes in the course of the forming process, the part without deformation in FIG. 5, and the part in an intermediate state, having an intermediate shape, in FIG. 4. Intermediate shapes of the part are computed by the simulation of the forming process. The location and shape of the critical areas 11 and problem zones 12 is usually defined based on the final state or target state of the formed part 10, as shown in FIG. 3, but may also be detected and defined in an intermediate state. The simulation of the forming process provides information about the movement of the points of the material of the formed part 10 during the forming process. From this information, and given the shape or outline of a critical area 11 or problem zone 12, their outline in another state of the formed part 10 is computed by moving the points of the outline along with the material points of the formed part 10. This allows to visualize the evolution of the outline in the course of the forming process and helps to determine the causes of the problem. As a result, as in FIGS. 4 and 5, the shape of the critical areas 11*a*, 11*b*, 11*c* and problem zones 12*a*, 12*b*, 12*c*, 12*d* which were found or defined in the final state of FIG. 3 is shown (moving backwards in the forming process) in the preceding stages and shapes of the formed part 10. The evolution of the outline is displayed to the user as either an animated sequence of images, or by the simultaneous display of a number of images of the part with its shape evolving in the course of the forming process.

Figure 6:
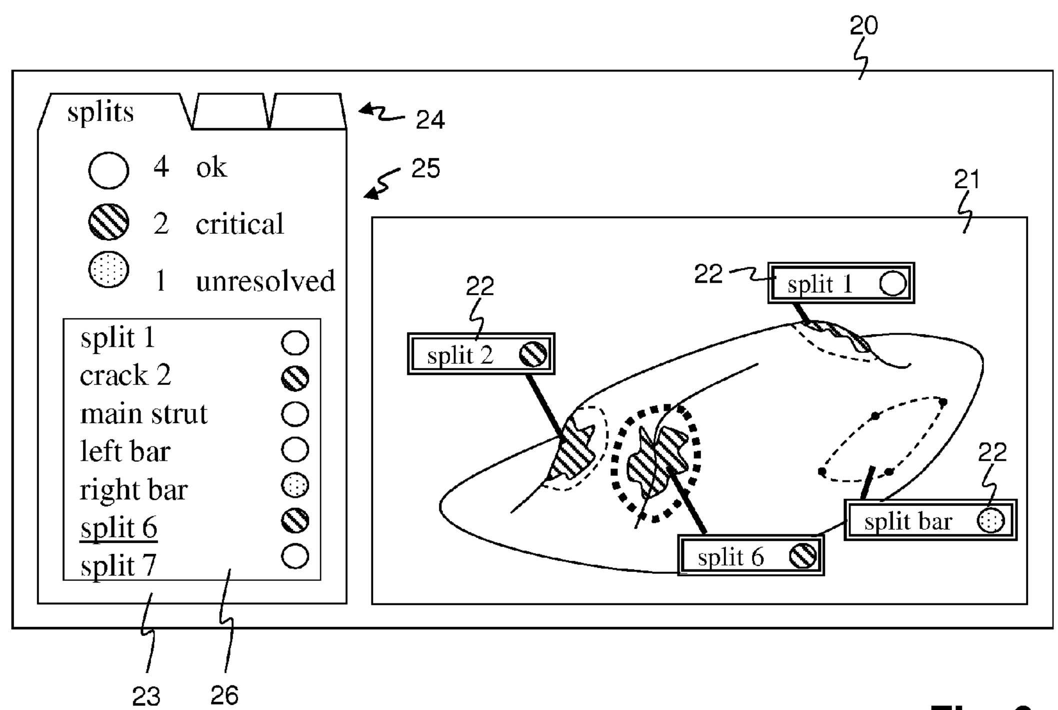
FIG. 6 schematically shows a graphical user interface for controlling the work with problem zones.

FIG. 6 schematically shows a graphical user interface 20 for controlling the work with problem zones. The graphical user interface 20 comprises a part display pane 21 with a visualization of the part as in FIGS. 3-5. The part display pane 21 may comprise floating panes 22, each of which is visually associated with a problem zone and displays summary information on the problem zone, such as a label and status and type (not shown in FIG. 6) of the problem zone. Such a floating pane 22 may be displayed only when the user moves the pointing device 4 over the problem zone or clicks on the problem zone, and/or only for problem zones with a given status, for example, only the problem zones whose status is "unresolved", and/or problem zones of a given type and/or problem zones referring to a given stage of the forming process.

The graphical user interface 20 further comprises a control pane 23 displaying information associated with the problem zones 12 and allowing selection and modification of problem zones 12 and of this information. In the present example, a problem type selection element 24 allows to select; e.g., by means of tabs (or a drop down list, not shown); one type of problem, causing a list of problem zones 26 of the selected type to be displayed, and summary information on this type of problem to be displayed in a summary area 25.

In the present example, the problem type selected is the risk of cracks, and the list of problem zones 26 shows the problem zones of this type. Problem zones that are highlighted in the list (e.g., by underlining) are automatically highlighted in the part display pane 21; e.g., by changing their color or brightness relative to the remainder of the formed part 10 visualization and/or by displaying their associated floating pane 22. Vice versa, problem zones selected in the part display pane 21 can be automatically selected and/or highlighted in the list of problem zones 26. Along with the label of a problem zone in the list of problem zones 26, and/or in the floating pane 22, a visual indication of the status of the problem zone is given; e.g., three colors (represented here by different hatching) standing for status values such as "ok", "critical", "acceptable", or "unresolved", etc. Labels of the problem zones can be generated automatically (such as "crack 1", etc.), and can be changed by the user (such as "left bar").

The summary area 25 shows, again with a color coded visual indication of the different status values, the number of problem zones 12 for each status.

Figure 7:
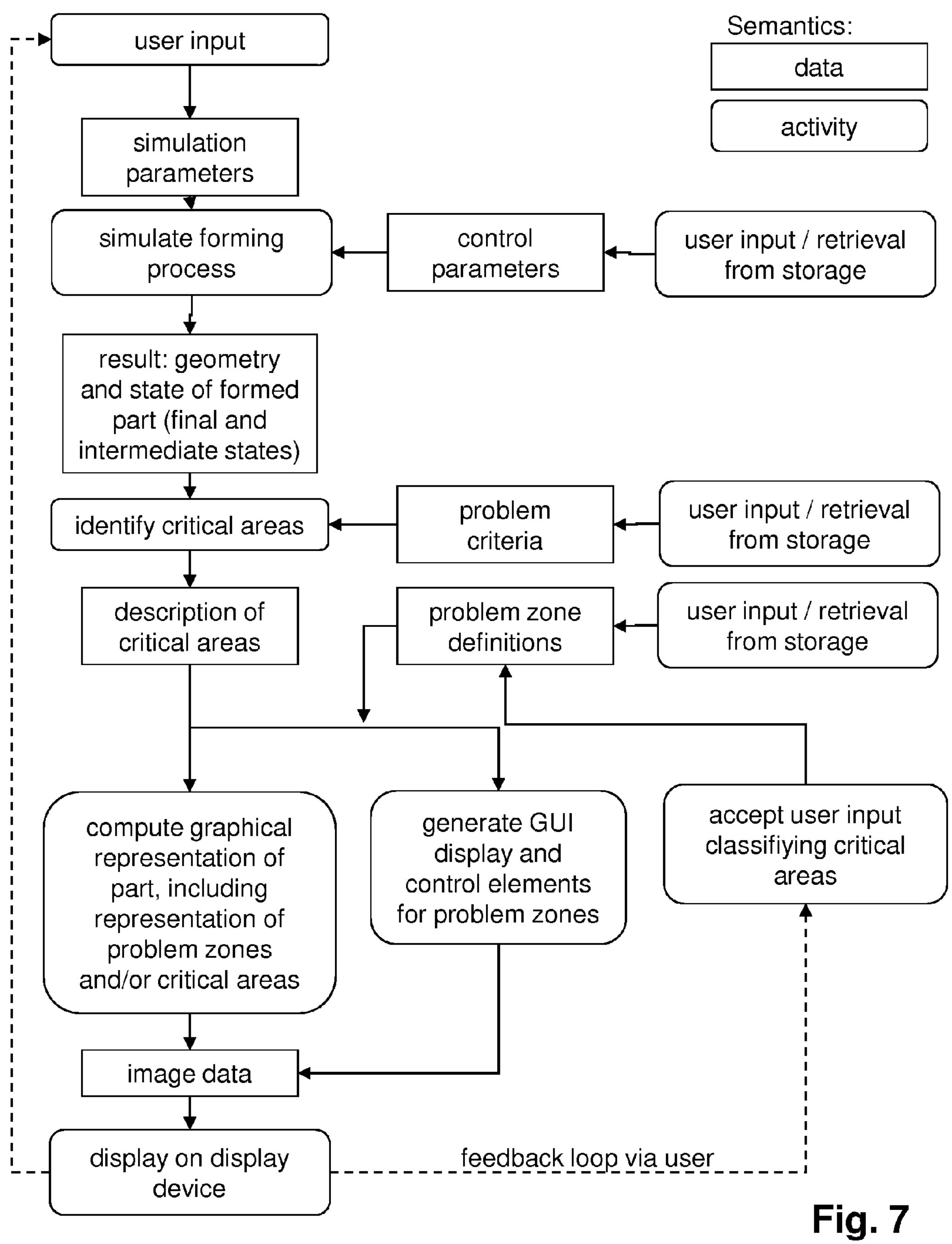
FIG. 7 schematically shows the flow of data and activities in an embodiment.

FIG. 7 schematically shows, in a summary manner, the flow of data and activities in an embodiment, with data entities being represented by rectangles, and activities performed by the computing system; i.e., its one or more processor, represented by rounded rectangles.

While the invention has been described in present embodiments of the invention, it is distinctly understood that the invention is not limited thereto, but may be otherwise variously embodied and practiced within the scope of the claims.

LIST OF REFERENCE NUMERALS

1 processing unit
2 storage unit
3 display
4 input device
10 formed sheet-metal part
11 critical area
12 problem zone
20 graphical user interface
21 part display pane
22 floating pane
23 control pane
24 problem type selection element
25 summary area
26 list of problem zones

What is claimed is:

1. A method for designing a sheet-metal-forming process for forming a sheet-metal part, the method being performed by a processor of a computing system, and comprising:

receiving input parameters including at least one of a simulation parameter and a numerical model of a geometry of the part, performing a numerical simulation of the forming process by which the part is formed, based on the input parameters, and computing a local property variable associated with points of the part from results of the numerical simulation of the forming process;

determining a plurality of problem zones of the sheet-metal part based on results of the numerical simulation of the forming process;

generating a visual representation of the sheet-metal part from the numerical model of the geometry of the sheet-metal part and displaying the visual representation on a display device operatively coupled to the processor, wherein the visual representation comprises visual information that indicates a location of at least one of the plurality of problem zones on the sheet-metal part; and computing and displaying on the display device a visual representation of information associated with the at least one of the plurality of problem zones whose location is indicated, wherein the information associated with the plurality of problem zones comprises a status of at least one of the plurality of problem zones, the visual indication representing at least one of OK and NOT OK.

2. The method of claim 1, wherein the visual representation of the sheet-metal part comprises visual information representing the local property variables.

3. The method of claim 1, wherein said determining problem zones based on the results of the numerical simulation of the forming process further comprises:

determining at least one critical area of the sheet-metal part in which a problem criterion is satisfied, wherein the problem criterion is defined in terms of the local property variables; and determining, for each critical area determined, an associated problem zone, wherein the associated problem zone is either identical to the critical area, or is determined as a simplified contour located on the sheet-metal part at the location of the critical area.

4. The method claim 1, wherein said determining a plurality of problem zones based on user input further comprises:

accepting a user input by means of a pointing device indicating at least one point on the visual representation of the sheet-metal part; and computing the location of a corresponding zone in the numerical model of the sheet-metal part.

5. The method of claim 1, wherein the local property variables comprise at least one of:

state variables representing a state of material of the sheet-metal part after the forming process or during the forming process in each point of the part; and performance variables which express a quality of the formed sheet-metal part in each point of the part.

6. The method of claim 1, wherein the information associated with the at least one of the plurality of problem zones further comprises a unique label identifying the at least one of the plurality of problem zones.

7. The method of claim 1, further comprising computing and displaying on the display device, a visual representation of different types of status that are associated with at least one of the plurality of problem zones, and, associated with each type of status, a number indicating a number of problem zones which have said status.

8. The method of claim 1, further comprising grouping problem zones according to type and displaying in the visual representation of the sheet-metal part only those of one or more selected groups.

9. The method of claim 1, further comprising computing and displaying on the display device:

a visual representation of a geometry of the sheet-metal part as the sheet-metal part changes in the course of the forming process; and the location of at least one problem zone tied to the material points of the sheet-metal part and being deformed along with the part.

10. The method of claim 1, further comprising:

accepting user input that defines modified input parameters;

simulating the forming process based on the modified input parameters and computing the local property variables from the results of the numerical simulation of the forming process;

determining for at least one of the problem zones of the sheet-metal part whether a problem criterion is satisfied, wherein the problem criterion is defined in terms of the local property variables; and computing and displaying on the display device, an update of the visual representation of the information associated with the at least one problem zone.

11. The method of claim 1, further comprising:

accepting user input which defines a modified geometry of the formed sheet-metal part or tools; and computing and displaying on the display device the modified geometry and visual information that indicates a modified location of at least one of the plurality of problem zones; wherein the modified location of the at least one the plurality of problem zone is computed from the location of the at least one problem zone by mapping points from the geometry of the sheet metal part to points on the geometry of the modified sheet-metal part.

12. The method of claim 1, further comprising:

accepting user input identifying one problem zone; and computing and displaying on the display device a magnified view of the problem zone from a viewing angle at which the problem zone is not occluded by other zones of the sheet-metal part, or is occluded as little as possible to facilitate effective viewing.

13. A method for designing a sheet-metal-forming process for forming a sheet-metal part, the method being performed by a processor of a computing system, and comprising:

receiving input parameters including at least one of a simulation parameter and a numerical model of a geometry of the part;

performing a numerical simulation of the forming process by which the part is formed, based on the input parameters;

computing a local property variable associated with points of the part from results of the numerical simulation of the forming process;

determining a plurality of problem zones of the sheet-metal part based on results of the numerical simulation of the forming process;

generating a visual representation of the sheet-metal part from the numerical model of the geometry of the sheet-metal part and displaying the visual representation on a display device operatively coupled to the processor, wherein the visual representation comprises visual information that indicates a location of at least one of the plurality of problem zones on the sheet-metal part; and computing and displaying on the display device a visual representation of information associated with the plurality of problem zones whose location is indicated, wherein the information associated with the plurality of problem zones comprises a status of at least one of the plurality of problem zones and a unique label identifying each of the plurality of problem zones.

14. A non-transitory computer readable medium comprising computer-executable instructions, which when executed by a processor of a computing system, cause the computing system to perform A method for designing a sheet-metal-forming process for forming a sheet-metal part, the method being performed by a processor of a computing system, and comprising:

receiving input parameters including at least one of a simulation parameter and a numerical model of a geometry of the part;

performing a numerical simulation of the forming process by which the part is formed, based on the input parameters;

computing a local property variable associated with points of the part from results of the numerical simulation of the forming process;

determining a plurality of problem zones of the sheet-metal part based on results of the numerical simulation of the forming process;

generating a visual representation of the sheet-metal part from the numerical model of the geometry of the sheet-metal part and displaying the visual representation on a display device operatively coupled to the processor, wherein the visual representation comprises visual information that indicates a location of at least one of the plurality of problem zones on the sheet-metal part; and computing and displaying on the display device a visual representation of information associated with the plurality of problem zones whose location is indicated, wherein the information associated with the plurality of problem zones comprises a status of at least one of the plurality of problem zones and a unique label identifying each of the plurality of problem zones.

15. A non-transitory computer readable medium comprising computer-executable instructions, which when executed by a processor of a computing system, cause the computing system to perform A method for designing a sheet-metal-forming process for forming a sheet-metal part, the method being performed by a processor of a computing system, and comprising:

receiving input parameters including at least one of a simulation parameter and a numerical model of a geometry of the part;

performing a numerical simulation of the forming process by which the part is formed, based on the input parameters;

computing a local property variable associated with points of the part from results of the numerical simulation of the forming process;

determining a plurality of problem zones of the sheet-metal part based on results of the numerical simulation of the forming process;

generating a visual representation of the sheet-metal part from the numerical model of the geometry of the sheet-metal part and displaying the visual representation on a display device operatively coupled to the processor, wherein the visual representation comprises visual information that indicates a location of at least one of the plurality of problem zones on the sheet-metal part; and computing and displaying on the display device a visual representation of information associated with the plurality of problem zones whose location is indicated, wherein the information associated with the plurality of problem zones comprises a status of at least one of the plurality of problem zones, the visual indication representing at least one of OK and NOT OK.

* * * * *